No. 762,936. PATENTED JUNE 21, 1904.
D. O. PAIGE.
MEANS FOR CONTROLLING THE AERATION OF FERMENTING WORT.
APPLICATION FILED JUNE 20, 1902.
NO MODEL.
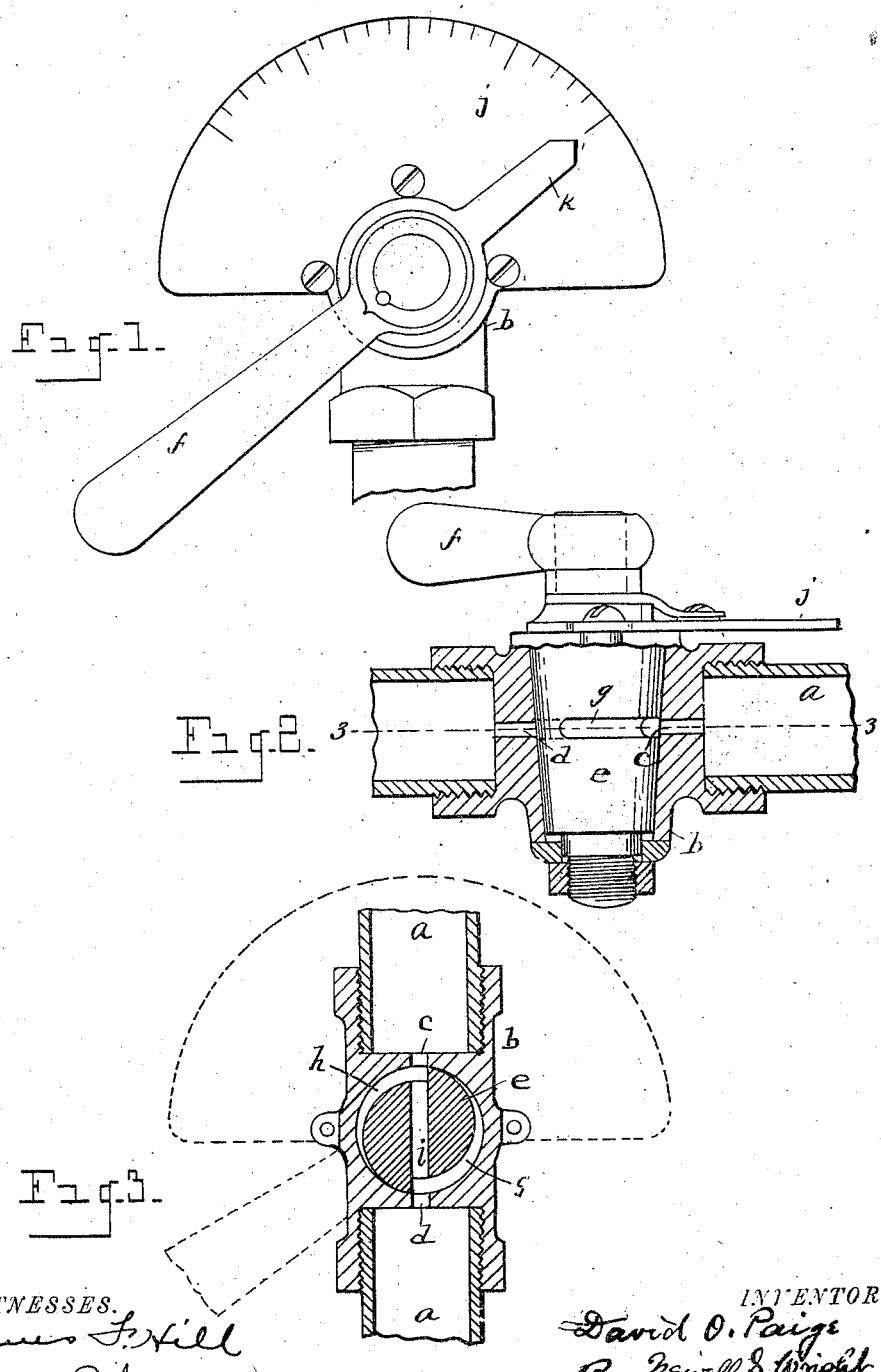

No. 762,936.

Patented June 21, 1904.

UNITED STATES PATENT OFFICE.

DAVID O. PAIGE, OF DETROIT, MICHIGAN, ASSIGNOR TO PFAUDLER VACUUM FERMENTATION CO., OF ROCHESTER, NEW YORK, A CORPORATION OF NEW YORK.

MEANS FOR CONTROLLING THE AERATION OF FERMENTING WORT.

SPECIFICATION forming part of Letters Patent No. 762,936, dated June 21, 1904.

Application filed June 20, 1902. Serial No. 112,426. (No model.)

*To all whom it may concern:*

Be it known that I, DAVID O. PAIGE, a citizen of the United States, residing at Detroit, county of Wayne, State of Michigan, have invented a certain new and useful Improvement in Means for Controlling the Aeration of Fermenting Wort; and I declare the following to be a full, clear, and exact description of the invention, such as will enable others skilled in the art to which it appertains to make and use the same, reference being had to the accompanying drawings, which form a part of this specification.

My invention has for its object means for controlling the aeration of fermenting wort in a fermenting apparatus; and it consists of the construction, combination, and arrangement of devices hereinafter specified and claimed, and illustrated in the accompanying drawings, in which—

Figure 1 is a view in plan, illustrating features of my invention. Fig. 2 is a view in vertical section. Fig. 3 is a view in horizontal section on the line 3 3, Fig. 2.

My invention is more especially designed to be applied to the suction-pipe of a vacuum fermentation apparatus employed to supply air to the fermenting wort, although I do not limit myself solely thereto, as my invention may be employed where admission of air to the fermenting wort is effected under pressure.

In carrying out my invention as illustrated in the accompanying drawings, $a$ $a$ represent portions of pipe for supplying air to the fermenting wort, through which pipe air may be supplied by suction or pressure, as may be desired. My improved device is interposed in said pipe, the same consisting, essentially, of a valve-case $b$, provided with channels or ducts $c$ $d$, communicating with the adjacent portions $a$ $a$ of the supply-pipe, respectively, and with the interior of the case. A rotatable valve $e$ is located within said case, provided with an operating-handle $f$. Between its extremities the periphery of the valve is formed with arc-shaped recesses or graduated channels $g$ and $h$, said channels communicating with a transverse through channel or duct $i$, which in turn communicates with the ducts $c$ $d$ of the valve-case. The channels $g$ $h$ diminish in depth from their ends adjacent to the duct $i$ toward their opposite extremities, as shown, and terminating at points on the circumference of the valve short of the extremities of the duct $i$. The valve-case is provided with an index-plate $j$ and the valve with an indicator-finger $k$, traversing a scale upon the indicator-plate. It will be evident that by this means the valve may be set at any desired point on the scale to effect any given amount of aeration which may be desired.

The operation of the device is obvious. The channels $g$ $h$ of the valve may be adjusted by the rotation of the valve, so as to enlarge or diminish the amount of air supplied through the valve. Inasmuch as the channels $g$ $h$ diminish on the arc of the circle from the transverse duct or channel $i$ in the opposite direction, the valve may be turned to give an opening varying practically from an infinitesimal to a full-sized opening. The channels $g$ $h$ being elongated enable the amount of aeration effected to be registered upon the dial-plate $j$ more accurately than would be the case were there no channels $g$ $h$. The ability by this construction to graduate the openings so closely and register the same is a point of great importance. The graduations when the device is in operation may be tested by a meter, so as to insure the exact number of cubic feet of aeration in a given time. This construction enables a slight variation in the quantity of air that passes through the valve to be made with a comparatively long movement of the handle of the valve. I prefer that each of the graduated channels shall extend about the valve on an arc spanning more than ninety degrees, by which construction it will be seen that the supply of air admitted through the device will not be liable to be wholly cut off by the ordinary limited movement of the valve.

What I claim as my invention is—

1. A device for controlling the aeration of fermenting wort consisting of a valve-case having inlet and outlet channels in the same plane, and a rotatable valve therewithin, said valve constructed with a through-channel to communicate with the channels in said case, and with graduated channels on its periphery communicating with opposite extremities of the through-channel of the valve, the through-channels and the peripheral channels of the valve lying within the same transverse plane through the valve, the position of the graduated channels relative to the inlet and outlet channels of the valve-case determining the amount of air passing through the device.

2. A device for controlling the aeration of fermenting wort consisting of a valve-case having inlet and outlet channels in the same plane, and a rotatable valve therewithin, said valve constructed with a through-channel to communicate with the channels in said case, and with graduated channels on its periphery communicating with opposite extremities of the through-channel of the valve, the through and peripheral channels of the valve lying within the same sectional plane as the inlet and outlet channels of the case, said case and valve the one provided with an indicator-plate, and the other with an index-finger traversing said plate, the position of the graduated channels relative to the inlet and outlet channels of the valve-case determining the amount of air passing through the device.

3. A device for controlling the aeration of fermenting wort consisting of a valve-case having inlet and outlet channels in the same plane, and a rotatable valve therewithin, said valve constructed with a transverse through-channel to communicate with the channels of the valve-case, and with elongated graduated channels on the periphery of the valve each communicating at one end thereof with said transverse channel, and diminishing in depth in the opposite direction, the through and peripheral channels of the valve lying within the same sectional plane as the inlet and outlet channels of the case, the position of the graduated channels relative to the inlet and outlet channels of the valve-case determining the amount of air passing through the device.

4. A device for controlling the aeration of fermenting wort consisting of a valve-case having inlet and outlet channels in the same sectional plane longitudinally of the case and a valve having a limitless rotation therewithin, said valve constructed with a through-channel to communicate with the channels in said case, and with graduated channels on its periphery communicating with opposite extremities of the through-channel of the valve, the through and peripheral channels of the valve lying in the same sectional plane as that of the inlet and outlet channels of the case, the position of the graduated channels relative to the inlet and outlet channels of the valve-case determining the amount of air passing through the device.

5. A device for controlling the aeration of fermenting wort consisting of a valve-case having inlet and outlet channels in the same sectional plane longitudinally of the valve-case and a valve, said valve constructed with a through-channel to communicate with the channels in said case, and with graduated channels on its periphery communicating with opposite extremities of the through-channel of the valve, the through and peripheral channels of the valve lying within the same sectional plane as that of the inlet and outlet channels of the case, the position of the graduated channels relative to the inlet and outlet channels of the valve-case determining the amount of air passing through the device, the graduated channels of the valve each extending thereabout on an arc spanning more than ninety degrees.

6. A device for controlling the aeration of fermenting wort consisting of a valve-case having inlet and outlet channels in opposite ends thereof in the same sectional plane longitudinally of the case, and a valve having a limitless rotation therewithin, said valve constructed with a through-channel to communicate with the channels in said case, and with oppositely-projecting graduated channels on its periphery communicating with the opposite extremities of the through-channel of the valve, and with the inlet and outlet orifices of the case, the position of the graduated channels relative to the inlet and outlet channels of the valve-case determining the amount of air passing through the device.

7. A device for controlling the aeration of fermenting wort consisting of a valve-case having inlet and outlet channels in opposite ends thereof in the same sectional plane longitudinally of the case, a valve having a limitless rotation therewithin constructed with a through-channel to communicate with the channels in said case, and with oppositely-projecting graduated channels on its periphery communicating with the opposite extremities of the through-channel of the valve and with the inlet and outlet channels of the case, the position of the graduated channels relative to the inlet and outlet channels of the valve-case determining the amount of air passing through the device, said graduated channels extending about the valve on an arc spanning more than ninety degrees.

In testimony whereof I sign this specification in the presence of two witnesses.

DAVID O. PAIGE.

Witnesses:
  N. S. WRIGHT,
  J. M. POLAND.